United States Patent [19]
Lee

[11] 3,777,069
[45] Dec. 4, 1973

[54] TELEPHONE SILENCING APPARATUS

[76] Inventor: Maw-Huei Lee, 251 Tenth St. N.W., Apt. 80, Bldg. 8, Atlanta, Ga. 30318

[22] Filed: Apr. 19, 1972

[21] Appl. No.: 245,522

Related U.S. Application Data

[63] Continuation-in-part of Ser. No. 112,122, Feb. 3, 1971, Pat. No. 3,710,032.

[52] U.S. Cl. .............................. 179/84 R, 179/84 L
[51] Int. Cl. .............................................. H04q 9/00
[58] Field of Search ............... 179/84 R, 84 C, 84 L

[56] References Cited

UNITED STATES PATENTS 3,226,489 12/1965 Grambsch ........................ 179/84 C

*Primary Examiner*—Kathleen H. Claffy
*Assistant Examiner*—Alan Faber
*Attorney*—B. J. Powell

[57] ABSTRACT

Apparatus for selectively silencing the bell of a telephone wherein the method comprises selectively reducing the resultant magnetomotive force through the ringer circuit to a value below that necessary to ring the bell. The method also includes selectively increasing the ringing voltage output from the central system generator with a transformer to increase the current level in the ringer circuit and thus the magnetomotive force above that necessary to ring the bell.

The embodiment of the apparatus includes an impedance means selectively connectable between the incoming ringer hot wire and the ringer circuit of the telephone by a switch. The impedance means has an impedance valve sufficiently great to reduce the current flow through the ringer circuit and thus the magnetomotive force below that necessary to ring the bell when the standard ringing signal voltage is imposed thereon. This embodiment of the apparatus may also include a voltage step-up transformer selectively connecting the signal generator to the ringer circuit to increase the ringer voltage and the ringer current as well as the magnetomotive force to a value above that necessary to ring the bell.

The embodiment of the apparatus also includes an accumulator circuit selectively connecting the incoming ringer hot wire with the ringer circuit in such a way as to silence the bell of the telephone until a predetermined number of ring signals have been received.

10 Claims, 3 Drawing Figures

TELEPHONE SILENCING APPARATUS

CROSS-REFERENCE TO RELATED APPLICATIONS

This application is a continuation-in-part of my co-pending application Ser. No. 112,122, now U.S. Pat. No. 3,710,032, filed Feb. 3, 1971, for "Telephone Method and Apparatus."

BACKGROUND OF THE INVENTION

Frequently telephone users desire to prevent the telephone from ringing in order to not be disturbed. In an attempt to solve this problem, users sometimes leave the handset out of its cradle so that the ringer circuit is disconnected and the main line circuitry is connected. After a short time in which no signals are transmitted over the main line circuitry, the central telephone circuitry imposes an audible signal over the line to disturb the user and indicate to the user that the handset is off the cradle. Moreover, when the handset is out of its cradle, an imcoming caller receives a busy signal indicating that the telephone is in use. This causes the incoming caller to be encouraged to call back later, and, if he continues to receive a busy signal, to have the telephone verified by a telephone operator. When the operator finds that the handset is simply out of the cradle and not in use, a very loud audible signal will be caused to issue from the handset to have same returned to the cradle or sometimes a technician is sent to the user's address to check the telephone. Also, when the handset is out of its cradle, a constant power drain is imposed on the central telephone circuitry and if the telephone is on a party line, other telephone users on the line are illegally prevented from using their telephone.

Users also disconnect the bell in the telephone from the ringer circuit so that an open exists in the ringer circuit. This has been unsatisfactory due to the fact that the telephone must be disassembled each time it is desired to connect or disconnect the bell. Once the ringer circuit is disconnected and the caller asks for verification from the telephone company that the telephone is operative, its open circuit will indicate that the telephone is out of order and a technician will be sent to repair same.

Users may also completely disconnect the telephone from the main line circuitry. In addition to causing the same problems as expressed with a disconnected ringer circuit, the user may forget to re-connect the telephone in an emergency thereby preventing the user from making an outgoing call.

Some users may silence the bell by mechanically preventing the bell hammer from striking the bell. Using this technique requires that the telephone be disassembled each time the bell is silenced and also makes it difficult to indicate the status of the ringer circuit.

Thus, there has been no satisfactory inexpensive way to selectively prevent the telephone from ringing.

SUMMARY OF THE INVENTION

These and other problems associated with the prior art are overcome by the invention disclosed herein by providing a means by which the ringing circuit of the telephone can be silenced without interfering with the use of the telephone for outgoing telephone calls or the operation of the telephone in conjunction with the central telephone system. Means is also provided whereby the telephone ringing circuit can be made audible from the central telephone system to insure that the user can be reached in an emergency. Also means is provided for silencing the bell until a predetermined number of ringing signals have been received.

The embodiment of the apparatus of the invention includes an impedance and switch means for selectively connecting the impedance in series with the telephone ringer circuit. The value of the impedance is such that the current level and thus the magnetomotive force will be maintained below the level to cause the telephone bell to ring when the normal ringer voltage is imposed thereon.

A transformer may be used in the central telephone system to selectively connect the normal ringing signal generator with the ringer circuit of the telephone to step up the voltage supplied to the ringer circuit and cause the current level to rise above that required to ring the bell when the additional impedance is interposed in the ringer circuit.

The embodiment of the invention also includes an accumulator circuit which silences the bell of the telephone until a predetermined number of successive ringing signals have been received. Means is provided for resetting the circuit after no ringing signal is received within a predetermined period of time.

These and other features and advantages of the invention disclosed herein will become more fully understood upon consideration of the following detailed description and accompanying drawings wherein like characters of reference designate corresponding parts through the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figures 1, 3:
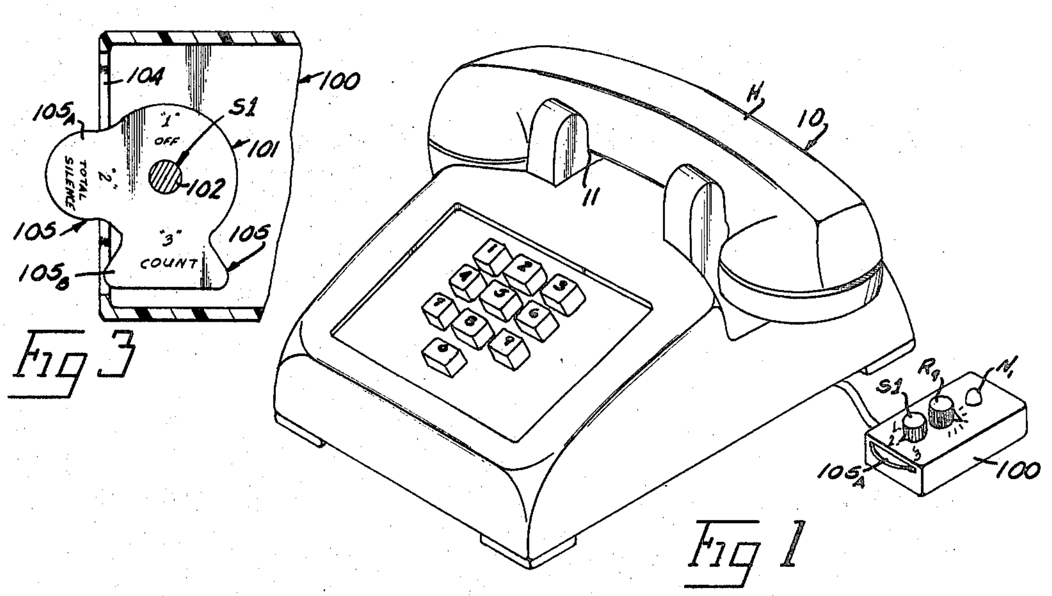
FIG. 1 is a perspective view showing one embodiment of the invention.
Figure 2:
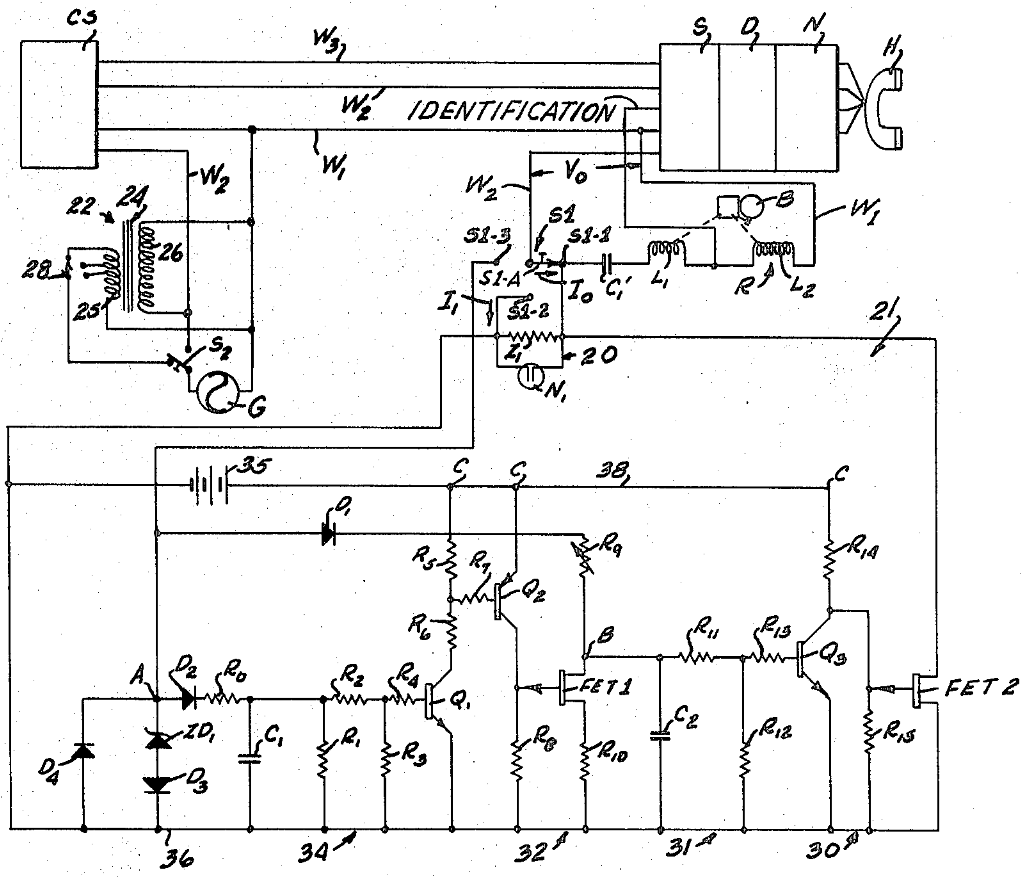
FIG. 2 is a schematic electrical diagram for the embodiment of the invention of FIG. 1; and, FIG. 3 is an enlarged partial cross-sectional view of the invention showing the visual state indicator.

Referring to FIGS. 1 and 2, it will be seen that the invention is used in conjunction with a standard telephone 10 and its associated circuit T. The standard telephone circuit has a ringer circuit R, a switchhook circuit S, a dial circuit D, a network circuit N and a handset H. Since the invention is connected to the ringer circuit R, only this circuit is shown in detail.

The telephone circuit T is connected to the central telephone system CS in conventional manner with the ringing signal generator G of system CS being selectively connectable to the ringer circuit R through the invention.

The ringer circuit R includes a pair of coils $L_1$ and $L_2$ used to drive bell B connected in series with each other and with a capacitor $C'_1$. This circuit is connected to common ground wire $W_1$ on one side and is selectively connected to ringer hot wire $W_2$ from the generator G through the switchhook circuit S. Thus, when handset H is in its cradle 11 of telephone 10 as seen in FIG. 1, the ringer circuit R is connected to wires $W_1$ and $W_2$ so that generator G can selectively impose the standard ringing voltage $V_o$ across the ringer circuit R to create a ringing current $I_o$ in coils $L_1$ and $L_2$ thereby generating the necessary magnetomotive force to ring the bell B.

Referring now to FIG. 2, the ringer hot wire $W_2$ is selectively connected to the ringer circuit R through a total silencing circuit 20, an accumulator circuit 21, or directly to the ringer circuit R for normal operation by a three position selector switch S1. The switch arm S1-A is connected to wire $W_2$, the contact S1-1 directly to the ringer circuit R, the contact S1-2 through the total silencing circuit 20 to ringer circuit R, and contact S1-3 through accumulator circuit 21 to ringer circuit R.

Circuit 20 includes an impedance $Z_1$ and a neon lamp $N_1$ connected between contact S1-2 and the ringer circuit R in parallel with each other so that the voltage on wire $W_2$ will be imposed across impedance $Z_1$ when arm S1-A is contacting contact S1-2. The combined impedance value of impedance $Z_1$ and lamp $N_1$ is sufficient to maintain the current $I_1$ through ringer circuit R less than the current $I_o$ through circuit R. This insures that the bell B will not ring since a current equal to or greater than current $I_o$ is necessary to generate a sufficient magnetomotive force to ring the bell B.

The neon lamp $N_1$ has a sufficiently low threshold voltage to be ignited when the voltage from the signal generator G is imposed on wire $W_2$ and a sufficiently low holding current to remain ignited as long as the voltage from the generator G is imposed on wire $W_2$. Thus, lamp $N_1$ will be lit when the bell B would normally ring but not when the generator G is not supplying a signal to the ringer circuit R. While various neon lamps $N_1$ may be used, it has been found that lamp model NE51 rated at 1/25 watt and manufactured by the General Electric Company is satisfactory.

If no visual ringing signal is required when the silencer circuit 20 is activated, then lamp $N_1$ can be eliminated. While various impedances $Z_1$ may be used as long as the ringer current $I_1$ is maintained below the current $I_o$, it has been found that a resistor of 18K ohms is satisfactory when lamp $N_1$ is used and a resistor of 10K ohms is satisfactory when lamp $N_1$ is eliminated.

In order for the bell on telephone 10 to still be rung from the central telephone system C even though circuit 20 is activated, an additional power circuit 22 may be selectively used to connect the ringing signal generator G to hot wire $W_2$ to increase the voltage supplied to the ringer circuit R sufficiently to cause a rise in current $I_1$ to a value above current $I_o$. This will cause the bell B to ring in case it is necessary to reach the telephone user for an emergency. Circuit 22 includes a switch S2 and a transformer 24. Switch S2 is effective to connect generator G directly to hot wire $W_2$ in one position and to connect generator G to the primary winding 25 of transformer 24 in its other position. The secondary winding 26 of transformer 24 is connected to hot wire $W_2$.

When generator G is connected to hot wire $W_2$, it supplies the standard voltage $V_o$ to ringer circuit R. When generator G is connected to the primary winding 25, the voltage is stepped up through secondary winding 26 to ringer circuit R. The amount of voltage from the secondary winding 26 is stepped up sufficiently to cause the current $I_1$ through circuit 20 and ringer circuit R to equal or exceed the value of current $I_o$ so that the bell B in telephone 10 will ring. Since the amount of voltage necessary to generate a sufficient current in circuit 20 may vary due to transmission losses, transformer 24 may have a mechanism 28 to vary the output voltage from secondary winding 26 and adjust the current flow through circuits 20 and R.

The accumulator circuit 21 is connected to contact S1-3 of switch S1. The circuit 21 connects the ringer hot wire $W_2$ to ringer circuit R through the impedance $Z_1$ and lamp $N_1$ until a predetermined number of ringing signal pulses have been received whereupon the impedance $Z_1$ and lamp $N_1$ are shorted out of the circuit to again connect wire $W_2$ directly to ringer circuit R to ring the bell B. The accumulator circuit 21 includes a ringer switch network 30, a storage network 31, a reset switch network 32, a delay network 34 and a DC power source 35. The delay network 34 is activated when a ringing signal is received and arm S1-A is connected with contact S1-3 to cause the storage network to be partially charged each time a ringing signal is received. When a predetermined number of ringing signals have been received the storage network causes the ringer switch network 30 to conduct and connect the incoming hot wire $W_2$ directly to the ringer circuit R rather than through impedance $Z_1$ and lamp $N_1$ to ring bell B. The delay network 34 maintains the reset switch network 32 activated for a predetermined period after each ringing signal is received so that if the normal ringing signal sequence is broken, the storage network 31 will be discharged to reset the accumulator circuit 21.

Referring to FIG. 2, it will be seen that contact S1-3 is connected directly to input A of the delay network 34 and to the common input B of networks 31 and 32 through diode $D_1$ and resistor $R_9$. The power source 35 shown is a battery connected to a common ground wire 36 and common hot wire 38. Wire 38 is connected to inputs C of networks 30 and 32. The common ground wire 36 is also connected to the ringer circuit R through the circuit 20.

The network 30 includes resistors $R_{14}$ and $R_{15}$, transistor $Q_3$ and field effect transistor FET 2; the network 31 includes resistors $R_{11}$–$R_{13}$ and capccitor $C_2$; netowrk 32 includes transistors $Q_1$ and $Q_2$, field effect transistor FET 1, and resistors $R_5$–$R_8$ and $R_{10}$; and, network 34 includes resistors $R_0$–$R_4$, diodes $D_2$–$D_4$, zener diode $ZD_1$ and capacitor $C_1$. The values of the capacitors and resistors are shown on Table I annexed to the end of this specification.

In network 34, the diode $D_4$ is in parallel with the zener diode $ZD_1$ and diode $D_3$ connected between input A and ground wire 36. Capacitor $C_1$ and resistor $R_1$ are also connected in parallel with each other and in series with diode $D_2$ and resistor $R_o$ between input A and ground wire 36. Resistors $R_2$ and $R_3$ are connected in series to input A and wire 36 in series with diode $D_2$ and resistor $R_o$ in parallel with capacitor $C_1$ and resistor $R_1$. The base of transistor $Q_1$ is connected to input A through resistors $R_o$, $R_2$ and $R_4$ and diode $D_2$.

The emitter of transistor $Q_1$ in network 32 is connected to ground wire 36 and the collector is connected to hot wire 38 through resistors $R_5$ and $R_6$ in series. The base of transistor $Q_2$ is connected to the common point of resistors $R_5$ and $R_6$ through resistor $R_7$, its emitter is connected to wire 38, and its collector connected to wire 36 through resistor $R_8$. It will be noted that transistor $Q_1$ is an *npn* type while transistor $Q_2$ is a *pnp* type. The gate of field effect transistor FET 1 is connected to the common point between resistor $R_8$ and the collector of transistor $Q_2$, its source is connected to ground wire 36, and its drain is connected to input B.

The capacitor $C_2$ of network 31 is connected to input B and ground wire 36 in parallel with resistors $R_{11}$ and $R_{12}$ in series. The base of transistor $Q_3$ is connected to input B through resistors $R_{11}$ and $R_{13}$.

Transistor $Q_3$ of network 30 has its collector connected to input C through resistor $R_{14}$ and its emitter connected directly to groung wire 36. A resistor $R_{15}$ is connected between the common point between the collector of transistor $Q_3$ and resistor $R_{14}$ and the ground wire 36. The gate of field effect transistor FET 2 is also connected to the common point between the collector of transistor $Q_3$ and resistor $R_{14}$ with its drain connected directly to ringer circuit R and its source connected to ground wire 36. Transistor $Q_3$ is an npn type while both field effect transistors FET 1 and FET 2 are p type.

Thus, when switch arm S1-A is connected to contact S1-3 and a ringing signal is received, the ringing voltage is transmitted to the ringer circuit R through circuit 20 and to inputs A and B of the accumulator circuit 21. This silences bell B because the current $I_1$ when the standard voltage $V_o$ is imposed across circuit 20 and circuit R is below that necessary to ring the bell. The use of the power circuit 22 is not effected so that a step up in voltage through transformer 24 can still be used to ring the bell B. The ringing voltage at input A causes a voltage drop across zener diode $ZD_1$, here shown as 4.4 volts to charge capacitor $C_1$ and cause transistor $Q_1$ to conduct. This in turn causes transistor $Q_2$ to conduct which triggers field effect transistor FET 1 to cause it to open and cease conduction. This allows the ringing voltage to charge capacitor $C_2$. The resistor $R_9$ serves to control the charging rate of capacitor $C_2$ so that a predetermined number of ringing signals must be received before capacitor $C_2$ is sufficiently charged to activate the ringer switch network 30. The resistor $R_9$ is shown as a variable resistance in order that the number of ringing signal pulses necessary to charge the capacitor $C_2$ can be varied.

When each ringing signal terminates, the capacitor $C_1$ in network 34 serves to maintain transistors $Q_1$ and $Q_2$ in a conducting state for a predetermined period of time, here shown as 6 seconds. Since another ringing signal will be received within the 6 second interval until the connection is broken, the field effect transistor FET 1 will remain open as long as the normal ringing signal pulse rate is achieved so that capacitor $C_2$ will be cumulatively charged each time a ringing signal is received until the capacitor $C_2$ is sufficiently charged.

With the value of capacitor $C_2$ shown, the resistor $R_9$ can be used to vary the number of ringing signal pulses required to charge capacitor $C_2$ and thus bell B from zero to 25 times. It is to be understood, however, that the resistance range of resistor $R_9$ or the value of capacitor $C_2$ may be changed to further vary the charging time. If it is not desirable to vary the charging time of capacitor $C_2$, then resistor $R_9$ may have a fixed value.

When capacitor $C_2$ is sufficiently charged, it causes the transistor $Q_3$ to conduct which in turn causes field effect transistor FET 2 to conduct. When the field effect transistor FET 2 conducts, it shorts out the circuit 20 with its impedance $Z_1$ and lamp $N_1$, and connects the ringing voltage directly across the ringer circuit R to ring the bell B. This is because the ringing signal can pass through zener diode $ZD_1$, diode $D_3$, ground wire 36 and field effect transistor back to contact S1-1. The ringing of the bell B is prevented until capacitor $C_2$ is sufficiently charged since transistor $Q_3$ and field effect transistor FET 2 are not conducting and the ringing signal must pass through zener diode $ZD_1$, diode $D_3$, and wire 36 back to contact S1-2 so that the circuit 20 is added to the ringer circuit R.

The capacitor $C_1$ maintains the transistors $Q_1$ and $Q_2$ in a conducting condition for a prescribed period of time after the removal of the ringing signal pulse voltage from input A as it discharges through its associated RC network. This maintains field effect transistor FET 1 in a non-conducting conditfon. When the capacitor $C_1$ has sufficiently dischargd to cause the voltage at the base of transistor $Q_1$ to drop below its threshold voltage, the transistors $Q_1$ and $Q_2$ cease to conduct thereby causing field effect transistor FET 1 to conduct and quickly discharge capacitor $C_2$. This serves to reset the circuit 21. If another ringing signal pulse is received before capacitor $C_1$ discharges below the threshold voltage of transistor $Q_1$, field effect transistor FET 1 will not be allowed to conduct so that charging of capacitor $C_2$ can continue.

As seen in FIGS. 1 and 3, the switch S1 and the circuits 20 and 21 are mounted in a housing 100 with the necessary wires extending therefrom to be connected to the telephone 10. The control knobs of the mode selector switch S1 and the variable resistance R9 are exposed to be manually operated. In order to visually indicate the status of the silencing circuitry, an indicator 101 is mounted on shaft 102 of the switch S1 within the housing 100. An appropriate slot 104 is provided through housing 100 adjacent switch S1 so that the indicator lugs 105 may project therethrough as seen in FIG. 3. It will be noted that no lug 105 will protrude when switch S1 is in its "1" or "off" position, that lug $105_A$ will protrude when switch S1 is in its "2" or "total Silence" position, and that lug $105_B$ will protrude when switch S1 is in its "3" or "count" position. To further facilitate a visual indication of the circuit status, the lugs 105 may be color coded and have different shapes such as the semicircular shape of lug $105_A$ and rectangular shape of lug $105_B$.

While specific embodiments of the invention have been disclosed herein, it is to be understood that full use may be made of modifications, substitutions and equivalents without departing from the scope of the inventive concept.

COMPONENT TABLE

| Component | Value |
|---|---|
| Resistor $R_0$ | 47 ohms |
| Resistor $R_1$ | 12 K ohms |
| Resistor $R_2$ | 2 M ohms |
| Resistor $R_3$ | 1 M ohms |
| Resistor $R_4$–$R_7$ | Depends on transistors $Q_1$ and $Q_2$ |
| Resistor $R_8$ | 8 M ohms |
| Resistor $R_9$ | Depends on desired charging rate for capacitor $C_2$ (Variable) |
| Resistor $R_{10}$ | 100 ohms |
| Resistors $R_{11}$–$R_{15}$ | Depends on transistors $Q_3$ and $FET_2$ |
| Capacitor $C_1$ | 500 $\mu$ farad |
| Capacitor $C_2$ | 500 $\mu$ farad |
| Zener diode $ZD_1$ | 4.4 volts drop across |

I claim:

1. Apparatus for selectively silencing the bell in the ringer circuit of a telephone and its associated incoming signal carrying wires for a prescribed number of ringing signal pulses and for selectively operating the bell after a predetermined number of ringing signals have been receivd including:

first means for selectively reducing the resultant magnetomotive force in the ringer circuit of said telephone below that necessary to ring said bell when the standard ringing voltage is imposed across the incoming ringer signal carrying wires to said telephone; and, accumulating means for selectively connecting the incoming signal carrying wires to the telephone ringer circuit through said first means, and for connecting the incoming wires directly to the ringer circuit, said accumulating means responsive to the incoming ringer signal pulses to connect the incoming wires to the ringer circuit through said first means to silence the bell until a predetermined number of ringing signal pulses have been received, and for connecting the incoming wires directly to the telephone ringer circuit after said prescribed number of signal pulses have been received to cause the bell to be rung.

2. The apparatus of claim 1 wherein said accumulating means includes reset means responsive to the time interval between pulses of the ringing signal to reset said accumulating means for a new cycle of operation when the time between the pulses exceeds a prescribed amount.

3. The apparatus of claim 2 wherein said accumulating means includes first switch means, capacitive means, and second switch means, said first switch means responsive to operation of said reset means to connect said capacitance means to the ringing signal when said time interval between said pulses does not exceed said prescribed amount and to prevent discharge of said capacitive means between pulses of the ringing signal so as to cumulatively charge said capacitive means and to disconnect said capacitive means from the ringing signal and discharge said capacitive means when said time interval exceeds said prescribed value, and said second switch means connecting the incoming ringing signal wires to the telephone ringer circuit through said first means in its first operative state and connecting the incoming ringer signal wires directly to the telephone ringer circuit in its second operative state, said capacitve means operatively connect to said second switch means to maintain said second switch means in its first operative state until said capacitive means has cumulatively charged to a prescribed value on the receipt of the predetermined number of ringing signal pulses and to transfer said second switch means to said second operative state when said capacitive means is charged to said prescribed value.

4. The apparatus of claim 3 wherein said accumulating means further includes regulating means for controlling the rate at which said capacitive means is charged by the ringing signal.

5. The apparatus of claim 4 wherein said first switch means includes a field effect transistor which conducts when the voltage at its gate is high and does not conduct when the voltage at its gate is low, said gate operatively connected to said reset circuit and said field effect transistor operatively connected to said capacitive means to cause said capacitive means to be charged by the ringing signal pulses when said field effect transistor is not conducting, said reset circuit imposing a low voltage on said gate when said ring signal pulses are successively received within said prescribed time interval and imposing a high voltage on said gate when said time interval eetween said successive ringing signal pulses exceeds said prescribed amount.

6. The apparatus of claim 5 wherein said field effect transistor connects said capacitive means to ground to discharge same when said field effect transistor conducts.

7. The apparatus of claim 6 wherein said reset means includes voltage producing means operatively connected to the ringing signal for generating a prescribed voltage thereacross when a ringing signal pulse is imposed thereon, second capacitive means operatively connected across said voltage producing means for charging said second capacitive means when the ringing signal pulse is imposed on said voltage producing means, and transistor means operatively connected across said voltage producing means and said second capacitive means, said transistor means rendered conductive upon imposition of the ringing signal pulse on said voltage producing meas and maintained conductive for a predetermined period of time after the ringing signal pulse is removed from said voltage producing means by the discharge of said second capacitive means therethrough, the output of said transistor means operatively connected to said gate of said field effect transistor to impose a low voltage thereon when said transistor means conducts and to impose a high voltage thereon when said transistor means does not conduct.

8. The apparatus of claim 7 wherein said voltage producing means includes a zener diode.

9. The apparatus of claim 4 wherein said regulating meas is selectively variable to control the number of ringing signal pulses necessary to charge said capacitance means to said prescribed value.

10. The apparatus of claim 1 further including selector switch means for selectively connecting said first means directly between the incoming ringing signal wires and the ringer circuit to totally silence the bell and connecting said first means between the incoming ringing signal wires and the ringer circuit through said accumulating means.

* * * * *